United States Patent [19]

Jung

[11] 4,195,048
[45] Mar. 25, 1980

[54] COMPENSATION FOR DIFFERING HEIGHTS OF DIFFERENT MOLDS CLAMPED BETWEEN THE MOLD-CLAMPING PLATES OF AN INJECTION-MOLDING MACHINE

[75] Inventor: Dieter Jung, Freiamt-O, Fed. Rep. of Germany

[73] Assignee: Klöckner-Werke AG, Duisburg, Fed. Rep. of Germany

[21] Appl. No.: 941,138

[22] Filed: Sep. 11, 1978

[30] Foreign Application Priority Data

Sep. 10, 1977 [DE] Fed. Rep. of Germany ....... 2740830

[51] Int. Cl.² .......................... B29C 3/06; B29F 1/14
[52] U.S. Cl. ..................................... 264/40.1; 100/43; 264/40.5; 264/328; 425/129 R; 425/135; 425/139; 425/169; 425/171; 425/182; 425/190; 425/195
[58] Field of Search ................... 425/129 R, 135, 139, 425/145, 150, 162, 165, 167, 182, 183, 185, 190, 192, 193, 195, 408, 411, 542, 554, 556, 169, 171; 264/40.1, 40.5, 328; 100/DIG. 18, 43

[56] References Cited

U.S. PATENT DOCUMENTS

| 3,028,531 | 4/1962 | Heiberger et al. | 100/DIG. 18 |
| 3,819,774 | 6/1974 | Eggenberger et al. | 100/43 |
| 3,841,142 | 10/1974 | Aisuta et al. | 100/DIG. 18 |
| 3,941,534 | 3/1976 | Hunkar | 425/145 |

Primary Examiner—W. E. Hoag
Attorney, Agent, or Firm—Michael J. Striker

[57] ABSTRACT

An absolute-coded angular position indicator coupled to the shiftable one of two mold-clamping plates, produces a position signal indicating the position of the shiftable plate. This signal is applied to one input of a subtractor, whose output signal is displayed on a numerical display. The subtracting input of the subtractor receives a corrective signal from a manually set decades switch arrangement. When no mold is present between the clamping plates and the latter are pressed into direct contact with each other, the displayed numerical value is zero. When a mold is clamped between the plates, an non-zero value is displayed, and the set-up technician sets the decades switch arrangement to the displayed value. As a result the displayed value goes to zero. The output signal of the subtractor is furnished to control elements which must control machine operations in dependence upon the height of the particular mold being employed.

2 Claims, 2 Drawing Figures

COMPENSATION FOR DIFFERING HEIGHTS OF DIFFERENT MOLDS CLAMPED BETWEEN THE MOLD-CLAMPING PLATES OF AN INJECTION-MOLDING MACHINE

BACKGROUND OF THE INVENTION

The present invention concerns methods which compensate for the differing heights of molds used in injection-molding machines, to thereby compensate the operation of control devices which operate in dependence upon mold height.

Injection-molding machines typically comprise two mold-clamping plates which face each other, one usually being stationary and the other shiftable to and from the first. The two mold halves of a split mold are mounted on respective ones of the mold-clamping plates, and the mold-clamping plates are brought together to close the mold and to apply the requisite clamping force. With the mold thusly closed, the plastified molding material is injected through an injection passage which passes through one mold-clamping plate, by the plastifying and injecting screws, into the hollow interior of the closed mold to injection-mold the molded item desired. Thereafter, the mold is opened, and the molded item clinging to one mold half is ejected therefrom by an ejecting device. The mold is then closed again, and the next molded item is injection-molded.

In particular, when the mold has been opened to a predetermined extent, there is generated a control signal for the ejecting device, so that the ejector pin will enter into the one mold half and push out the molded item therein. This control or command signal is generated in dependence upon the position of the shiftable one of the two mold-clamping plates. In general, when changing over from one mold to another, the new mold will have a different height, as measured in the direction in which the mold-clamping plates are spaced from each other. Accordingly, upon such mold changeover, the means producing this control or command signal in dependence upon clamping plate position must be readjusted, to take into account the new mold height. Thus, when a new mold has been inserted, the operator must first close the mold and very carefully reestablish the setting of the means generating the control or command signal in question; this must be done very carefully. In general many of the control signals for injection-molding devices are way-dependent signals e.g. signals dependent of the position of the shiftable plate. These signals must be modifed or corrected when another mold of other height is clamped onto the plates. The correction or modification of these way-dependent signals is performed according to the invention by an absolute coded angle indicator.

SUMMARY OF THE INVENTION

It is the main purpose of the present invention to provide a method for effecting such compensation for changeovers to molds of different height, but of a character such that the operator is not called upon to perform tedious calibration or adjusting operations, while at the same time making no sacrifice in the exactness of the requisite compensation.

In accordance with the present invention, this is achieved as follows: The shiftable one of the mold-clamping plates has coupled thereto an absolute-coded angle indicator, producing an absolute-coded signal indicative of the position of the shifted mold-clamping plate. The output signal of the absolute coded angle indicator is applied to one input of a subtractor, whose other input receives a signal from a decades switch arrangement. The output signal of the subtractor is fed to a display device, which displays the subtracted value. With the decades switch arrangement in its zero-value setting, the displayed position value is zero if the mold-clamping plates are brought together into contact with no mold clamped between them; this is implemented for example at the factory where the injection-molding machine is manufactured prior to sale of the machine. During actual use, if the decades switch arrangement is in its zero-value setting, and the mold to be employed is closed between the two mold-clamping plates, the display now displays a non-zero position value according to the thickness of the mold. The operator can, for example, observe this displayed value, and then set the decades switch arrangement to such value, as a result of which the output signal from the comparator and the displayed position value go to zero. The output from the comparator or subtractor is applied to the usual control means controlling injection-molding machine operation in dependence upon clamping-plate position, e.g. for example, the aforementioned ejector device, but the control or command signals now produced take the height of the mold presently being used into account.

This spares operating personnel the relatively laborious task of adjusting for changed mold-height in the ordinary manner. The adjusting of the absolute-coded angle indicator and the display device for the case where the mold-clamping plates are brought into direct physical contact is done once, e.g., prior to sale of the machine, and during actual use of the machine the operator need only perform the adjustment described above. The operator need only insert the mew mold to be used, the new mold is then shut by way of the shiftable plate, then he looks at the displayed position value, and sets the decades switch arrangement to that value, to cause the displayed position value to go to zero. The subtractor inherently applies the requisite correction and compensation to the control means of the injection-molding machine, i.e., to the generation of control or command signals which are all distance- or position-dependent as function of the shiftable plate, so that after the traversal of an predetermined distance a moving component of the machine, e.g., the plastifying and injecting screw, the control signals dependent upon the traversal of such predetermined distances will be generated taking into account the changed mold height. The subtractor serves in a sense as a zero point corrector.

Absolute-coded angle indicators are per se conventional; see for example the publication "Prospekt Optoelectronische, absolute Winkelschrittgeber," of the Stegmann Company of West Germany. Such indicators coordinate each angular position to be indicatable with a predetermined combination of digits. This is in contrast, for example, to position indicators of the type consisting of counters which indicate position by counting pulses generated by rotary pulse generators. With absolute-coded angle indicators, when a particular angular position is reached, a corresponding code number or combination of code markings, uniquely associated with that single angular position, is for example opto-electronically read and converted into the output signal of the position indicator. Erroneous position or distance-travelled measurements are precluded, because the zero-position of the absolute-coded angle indicator is completely defined by the employed code itself, and each angle indicated is indicated individually, i.e., not in dependence upon correct sequential indication of preceding angular positions as in the case of pulse-counting angular position indicators.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
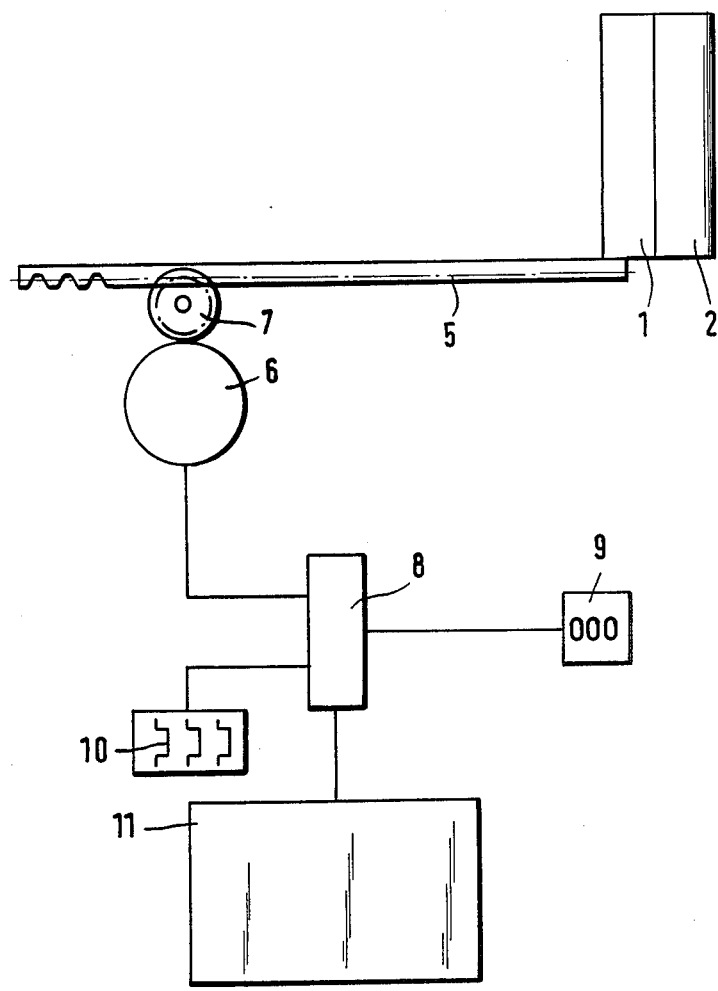
FIG. 1 schematically depicts the establishment of the zero-value setting of the equipment.
Figure 2:
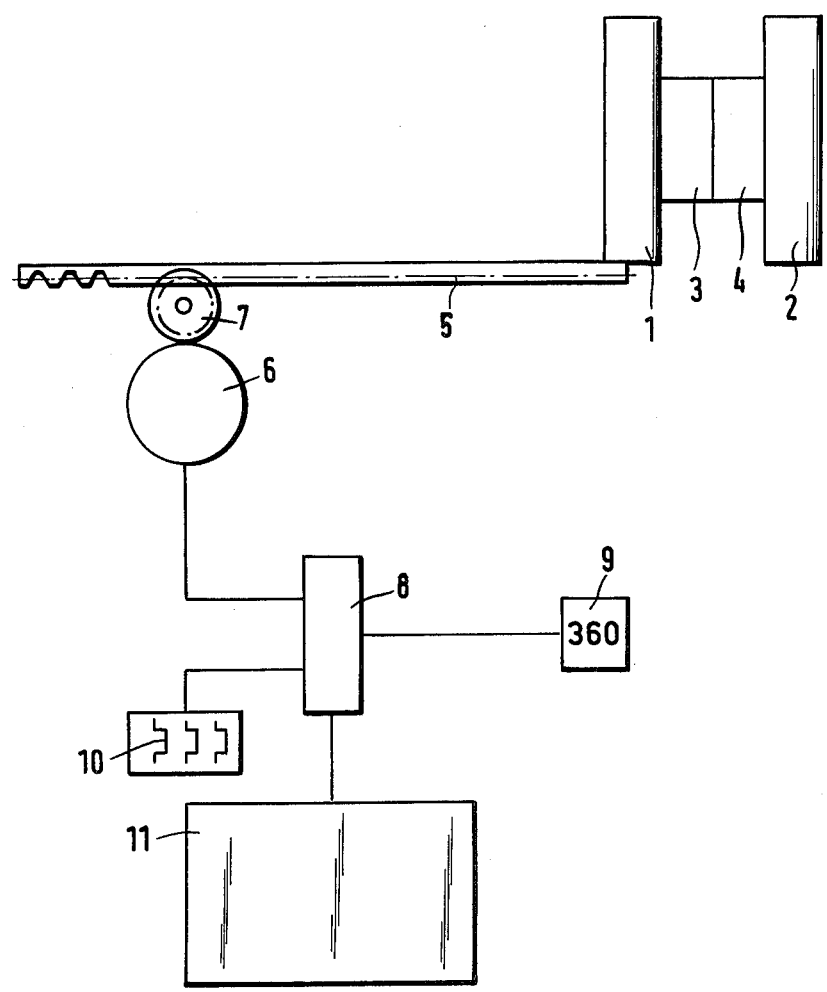
FIG. 2 schematically depicts how corrective compensation is performed so as to take into account the height of the particular mold presently being employed.

In FIG. 1, numerals 1 and 2 respectively denote the shiftable and stationary mold-clamping plates of an injection-molding machine. The mold-clamping plates 1, 2 are shown in FIG. 2 actually accommodating a split mold comprised of mold halves 3, 4. Connected to and sharing the movement of shiftable mold-clamping plate 1 is a rack 5, which is coupled to an absolute-coded angular position indicator 6 via an intermediate pinion 7. The output signal of angular position indicator 6 is applied to one input of a comparator 8. A display 9 is connected to the output of comparator 8. The subtracting input of comparator 8 receives a correction signal from a decades switch arrangement 10. In FIG. 1, the two mold-clamping plates 1, 2 are pressed together and in direct contact, with no mold between them. In this setting, the angular position indicator 6 is so designed that the position value displayed on display 9 is zero (as shown) i.e., if the decades switch arrangement 10 is in its zero setting so as not to introduce any corrective compensation. This relationship is established prior to sale or use of the injection-molding machine.

To establish the desired corrective compensation needed for a mold of particular height, the mold 3, 4 is inserted between the mold-clamping plates 1, 2 and clamping shut, as shown in FIG. 2. In this position, the absolute-coded angular position indicator 6 produces a position signal corresponding to the height of the mold being employed. The signal is transmitted via comparator or subtractor 8 to the display 9 and displayed, for example directly displaying mold height in millimeters. The operator observes the displayed height, and sets that value on the decades switch arrangement 10. As a result the latter applies a corresponding signal to the subtracting input of the comparator 8, and the display 9 now displays the value zero. The thusly corrected output signal from comparator 8 is furthermore applied to the control means 11 of the injection-molding machine, i.e., in particular to all control devices in such control means which generate control or command signals which must depend upon the height of the particular mold being employed, e.g., an ejector device ejecting the molded item from the mold half to which such item clings when the mold has been opened to a predetermined extent.

It will be clear that, by comparison to conventional techniques for taking into account the height of the molds employed, the technique of the present invention is particularly easy to perform, even by personnel having relatively little training.

It will be understood that each of the elements described above, or two or more together, may also find a useful application in other types of constructions and circuits differing from the types described above.

While the invention has been illustrated and described as embodied in the context of controlling the molded-item ejector of an injection-molding machine in dependence upon the extent to which the mold opens after performance of a molding operation, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A method of controlling the operation of an injection-molding machine, the injection-molding machine comprising a pair of mold-clamping plates one of which is stationary and the other shiftable serving to clamp split molds between them and control means operative for controlling at least one machine operation in dependence upon the height of the mold clamped between the mold-clamping plates, the method comprising: generating a position signal indicative of the position of the shiftable mold-clamping plate using an absolute-coded angular position indicator coupled to the shiftable mold-clamping plate, applying the position signal to one input of a subtractor and displaying the position signal using a display means connected to receive the output signal of the subtractor, the displayed position signal being zero when the mold-clamping plates are pressed together into contact with each other with no mold clamped between them, inserting a split mold between the mold-clamping plates and clamping the mold closed whereby the mold-clamping plates are spaced from each other and the displayed position signal is non-zero, and applying to the subtracting input of the subtractor a signal causing the displayed position signal to become zero using a decades switch arrangement connected to said subtracting input by setting the decades switch arrangement to a value corresponding to said non-zero position signal, and applying the output signal of the subtractor to the control means.

2. In an injection-molding machine, in combination, a pair of mold-clamping plates, one of which is stationary and the other shiftable, serving to clamp split molds between tham; position-indicating means producing a signal indicative of the position of the shiftable mold-clamping plate, and including an absolute-coded angular position indicator coupled to the shiftable mold-clamping plate, the angular position indicator producing said signal; a subtractor having a first input receiving said signal and having a second input and an output; a display means displaying the value of the output signal of the subtractor; a decades switch arrangement settable to settings corresponding to the values displayed by the display means and furnishing a second signal to the second input of the subtractor, whereby to cause the display means to display a zero value; and control means receiving the output signal from the subtractor and in dependence thereon controlling at least one machine operation in dependence upon the spacing between the mold-clamping plates and thereby in dependence upon the height of a mold clamped between the mold-clamping plates.

\* \* \* \* \*